United States Patent
Edwards et al.

(10) Patent No.: US 7,461,164 B2
(45) Date of Patent: Dec. 2, 2008

(54) MEDIUM ACCESS CONTROL WITH SOFTWARE -AND HARDWARE- BASED COMPONENTS IN A WIRELESS NETWORK

(75) Inventors: Paul C Edwards, San Francisco, CA (US); Heng-Mun Lam, Cupertino, CA (US)

(73) Assignee: DSP Group Inc., Santa Clara, CA (US)

( * ) Notice: Subject to any disclaimer, the term of this patent is extended or adjusted under 35 U.S.C. 154(b) by 700 days.

(21) Appl. No.: 10/361,807

(22) Filed: Feb. 7, 2003
(Under 37 CFR 1.47)

(65) Prior Publication Data
US 2004/0059825 A1 Mar. 25, 2004

Related U.S. Application Data

(60) Provisional application No. 60/355,204, filed on Feb. 8, 2002.

(51) Int. Cl.
G06F 15/16 (2006.01)
(52) U.S. Cl. ............... 709/236; 709/237; 709/250; 370/469
(58) Field of Classification Search ......... 709/227–228, 709/236–237, 250; 370/465–469, 229–236; 710/10–11, 72
See application file for complete search history.

(56) References Cited

U.S. PATENT DOCUMENTS

| | | | | |
|---|---|---|---|---|
| 5,850,526 | A * | 12/1998 | Chou | 709/247 |
| 5,937,169 | A | 8/1999 | Connery et al. | |
| 6,049,549 | A | 4/2000 | Ganz et al. | |
| 6,310,886 | B1 | 10/2001 | Barton | |
| 6,469,992 | B1 | 10/2002 | Schieder | |
| 6,493,328 | B2 * | 12/2002 | Fong et al. | 370/329 |
| 6,597,683 | B1 * | 7/2003 | Gehring et al. | 370/229 |
| 6,658,480 | B2 * | 12/2003 | Boucher et al. | 709/239 |
| 6,957,283 | B2 * | 10/2005 | Dhir et al. | 709/250 |
| 7,007,080 | B2 * | 2/2006 | Wilson | 709/221 |
| 7,106,757 | B2 * | 9/2006 | Hong et al. | 370/469 |
| 7,146,428 | B2 * | 12/2006 | Luo | 709/237 |

(Continued)

OTHER PUBLICATIONS

Lahiri et al., "Battery-Efficient Architecture for an 802.11 MAC Processor," Dept. of ECE, UC San Diego, C & C Research Labs, NEC USA.

(Continued)

*Primary Examiner*—Bharat N Barot
(74) *Attorney, Agent, or Firm*—Shumaker & Sieffert, P.A.

(57) ABSTRACT

A MAC architecture for WLAN stations partitions functionality between a software-based MAC component and a hardware-based MAC component that work together to balance function and performance. In general, the fulcrum for this balance centers on timing requirements. Accordingly, the hardware-based MAC component is designed to handle many of the functions that are processor-intensive and/or must be performed under strict timing constraints. The software-based MAC component is designed to handle many of the functions that are memory-intensive, but present more lenient timing requirements. The software-based MAC component may be configured to provide an efficient and robust interface to the hardware-based MAC component. In particular, the software-based MAC component may format and prioritize packets to be sent over the air interface, and generate a command structure that provides instructions for the hardware-based MAC component to process the packet.

52 Claims, 9 Drawing Sheets

U.S. PATENT DOCUMENTS 7,197,052 B1 * 3/2007 Crocker ........................ 370/469
2002/0078249 A1 6/2002 Lu et al.
2002/0080818 A1 6/2002 Zegelin

OTHER PUBLICATIONS

"ARC International's WLAN Now Delivers Complete Soft IP Blocks for 802.11a/b/g Modem/Baseband and MAC SoC Designs," .us.design-reuse.com/news/news4684html, Jan. 2003.

"Resonext Two-Chip, All-CMOS Chipset Solutions For Wireless LAN Platforms," .resonext.com/products_11-27-02.html, Nov. 2002.

J. Thomson et al., "An Integrated 802.11a Baseband and MAC Processor," Atheros Communications, Sunnyvale, California.

"Part 11: Wireless LAN Medium Access Control (MAC) and Physical Layer (PHY) Specifications-High-speed Physical Layer in the 5 GHz Band," LAN/MAN Standards Committee of the IEEE Computer Society, 1999.

Lough, Daniel L. et al., "A Short Tutorial on Wireless LANs and IEEE 802.11," The IEEE Computer Society's Student Newsletter, Summer 1997, vol. 5, No. 2; chapters 4 and 5.

Notification of Transmittal of the International Search Report or the Declaration, for corresponding PCT Application No. PCT/US2003/03991, dated Jul. 3, 2003 (6 pgs.).

Written Opinion of the International Preliminary Examining Authority, for corresponding PCT Application No. PCT/US2003/03991, dated Oct. 10, 2003 (4 pgs.).

Notification of Transmittal of the International Preliminary Examination Report for corresponding PCT Application No. PCT/US2003/03991, dated Apr. 23, 2004 (3 pgs.).

* cited by examiner

MEDIUM ACCESS CONTROL WITH SOFTWARE - AND HARDWARE- BASED COMPONENTS IN A WIRELESS NETWORK

This application claims priority from U.S. provisional application Ser. No. 60/355,204, filed Feb. 8, 2002, the entire content of which is incorporated herein by reference.

FIELD

The invention relates to wireless communication and, more particularly, to medium access control in a wireless network.

BACKGROUND

Wireless local area network (WLAN) stations, such as radio network cards and access points, include a medium access control (MAC) layer responsible for a variety of functions that support WLAN operation. In general, the MAC layer manages and maintains communication between WLAN stations. For example, the MAC layer coordinates access to a shared radio channel, and utilizes protocols to enhance communication over a wireless medium. The MAC layer and physical layer (PHY) handle transmission and reception of WLAN packets, and adheres to protocols designed to minimize collision between different stations.

Some wireless networking standards, such as the IEEE 802.11 standards, place many of the functions that are traditionally performed at higher layers of communication stacks in the MAC layer. For example, the IEEE 802.11 standards require that the MAC layer be responsible for scanning, authentication, association, encryption, fragmentation, and power management. Hence, a MAC layer designed for wireless networking may require delivery of high-level functionality in combination with low-level responsiveness. Such divergent requirements can make the design of the MAC layer a balancing act between functionality and performance.

SUMMARY

The invention is directed to a MAC architecture for WLAN stations. The MAC architecture partitions functionality between a software-based MAC component and a hardware-based MAC component that work together to balance function and performance. In general, the fulcrum for this balance centers on timing requirements. Accordingly, the hardware-based MAC component is designed to handle many of the functions that are processor-intensive and must be performed quickly. The software-based MAC component is designed to handle many of the functions that are memory-intensive, but present more lenient timing requirements.

As an example, the hardware-based MAC component may be responsible for clear channel assessment and collision retransmission due to aggressive timing requirements. In addition, the hardware-based MAC component may handle error detection, which is intimately linked to collision retransmission. The hardware-based MAC component also may perform encryption and decryption because those functions are processor-intensive, and can be performed in parallel with other functions in hardware.

The software-based MAC component may perform functions that permit more processing time, yet present aggressive memory requirements. Examples of functions that may be performed by the software-based MAC component include fragmentation, authentication, and network management. In particular, in some embodiments, the software-based MAC component may be responsible for key management. Such functions may present complex fringe conditions and inter-relations that are better managed in software.

The hardware-based MAC component may reside on a card or chip carried within a WLAN station. For example, the hardware-based MAC component may form part of a PC Cardbus card or a PCI board equipped for WLAN attachment. The software-based MAC component may run on a host processor linked to the hardware-based MAC component via an external bus, such as a PCI or USB bus. In this case, the implementation of a software-based MAC component may reduce the onboard memory requirements of the board or chip carrying the hardware-based MAC component. Alternatively, the software-based MAC component may run on an embedded processor that is intimately linked with the hardware-based MAC component via an internal bus or other internal interconnections.

The software-based MAC component may be configured to provide an efficient and robust interface to the hardware-based MAC component. In particular, the software-based MAC component may format and prioritize packets to be sent over the air interface, and generate a command structure that instructs the hardware-based MAC component how to process the packet. The software-based MAC component may pass the command structure to the hardware-based MAC component with or within the packet. The command structure may specify a variety of processing information, including information relating to transmit conditions, sequence number, encryption, transmit power, transmit rate, retransmission requirements, and the like. The use of such a command structure may be especially desirable when the software-based MAC component executes on a host processor and therefore communicates with the hardware-based MAC component via an external interface.

The hardware-based MAC component may incorporate two or more separate transmit queues. Also, the hardware-based MAC component can be programmed to selectively pull packets from the queues, e.g., on a priority basis. In this manner, the hardware-based MAC component may be programmed to expedite transmission of time critical packets such as beacons. Also, the hardware-based MAC component may be capable of processing the packets according to quality of service (QoS) designations for the packets. The software-based MAC component also may have a number of virtual queues to support QoS functions prior to transmission of packets to the hardware-based MAC component.

If the software-based MAC component runs on the host processor, the hardware-based MAC component may require less memory. For example, the hardware-based MAC component may be configured to store packets only in the transmit queue. The software-based MAC component may write the packets to the transmit queue without the need for other intermediate storage space in the hardware-based MAC component. In the event packet retransmission is required, the hardware-based MAC component may pull the unprocessed, "raw" packet from the transmit queue for reprocessing and retransmission. The hardware-based MAC component may attempt retransmission a number of times specified by the software-based MAC component. Alternatively, the software-based MAC component may specify zero retries by the hardware-based MAC component. The software-based MAC component then rewrites the raw packet to the transmit queue for processing if retransmission is required. Hence, retransmissions can be initiated within hardware-based MAC component or software-based MAC component. In either case, by not storing the processed packet in the hardware-based MAC component, the overhead required to track packets through the hardware is decreased, and interruptions in the transmit pipe, e.g., for QoS or time-dependent packets, can be achieved simply and cleanly.

As discussed above, the hardware-based MAC component may perform encryption and decryption functions due to the intensive processing requirements. However, the software-based MAC component may be responsible for management of keys used for encryption and decryption. For example, the software-based MAC component may be configured to load keys into a table in the hardware-based MAC component. There can be many individual key relationships, and the relevant keys will change as different WLAN stations associate and disassociate. For these reasons, the software-based MAC component may be configured to maintain the key table and keep the key table up to date with current associations.

The software-based MAC component and hardware-based MAC components may coordinate link assessment functions. For example, the software-based MAC component may specify a number of retransmission attempts following a transmission failure, as well as the power and rate of such transmission. The command structure may include a field for QoS adjustment. This field instructs the hardware-based MAC component to increase the transmit power on retransmissions if a specified number of transmit failures fails have occurred. This field can be used as a metric to quantify the quality of a radio frequency link.

When a link assessment is desired, the software-based MAC component initiates a transmission at a power level that is estimated to be too low for successful transmission. For this transmission, the software-based MAC component instructs the hardware-based MAC component to increase the power level upon retransmission. After the packet has been successfully transmitted, the software-based MAC component determines the number of retransmissions needed to achieve successful transmission. From this number, the software-based MAC component derives the minimum power level needed for a successful link at a specific data rate, and thereafter sets the power level in subsequent packets associated with a particular WLAN packet flow or communication session.

In one embodiment, the invention provides a method comprising sending a packet from a software-based medium access control (MAC) component to a hardware-based MAC component, wherein the MAC components implement MAC layer functionality for wireless networking. The method further comprises sending a command structure with the packet, wherein the command structure contains instructions for processing the packet within the hardware-based MAC component.

In another embodiment, the invention provides a device comprising a software-based medium access control (MAC) component, and a hardware-based MAC component. The MAC components implement MAC layer functionality for wireless networking. The software-based MAC component is configured to send a packet and a command structure with the packet. The command structure contains instructions for processing the packet within the hardware-based MAC component.

In an added embodiment, the invention provides a computer-readable medium comprising a command structure containing instructions for processing a packet within a hardware-based medium access control (MAC) component of a wireless networking MAC layer.

In a further embodiment, the invention provides a computer-readable medium comprising instructions to cause a processor to send a packet from a software-based medium access control (MAC) component to a hardware-based MAC component, and send a command structure with the packet, wherein the command structure contains instructions for processing the packet within the hardware-based MAC component. The MAC components implement MAC layer functionality for wireless networking.

In an added embodiment, the invention provides a method comprising sending a packet from a software-based medium access control (MAC) component to a hardware-based MAC component, wherein the MAC components implement MAC layer functionality for wireless networking, and resending the packet from the software-based MAC component to the hardware-based MAC component in the event of wireless transmission failure of the packet.

In another embodiment, the invention provides a device comprising a software-based medium access control (MAC) component, and a hardware-based MAC component, wherein the MAC components implement MAC layer functionality for wireless networking, wherein the software-based MAC component is configured to send a packet to the hardware-based MAC component, and resend the packet to the hardware-based MAC component in the event of wireless transmission failure of the packet.

In an added embodiment, the invention provides a computer-readable medium comprising instructions to cause a processor to send a packet from a software-based medium access control (MAC) component to a hardware-based MAC component, wherein the MAC components implement MAC layer functionality for wireless networking, and resend the packet from the software-based MAC component to the hardware-based MAC component in the event of wireless transmission failure of the packet.

In a further embodiment, the invention provides a method comprising transmitting a wireless local area networking (WLAN) packet at a first transmit power level selected to be insufficient for successful communication with a target device, transmitting one or more additional WLAN packets at successively increasing transmit power levels until successful communication with the target device is achieved. The quality of the wireless communication link with the target device can be assessed based on the transmit power level that supports successful communication.

The invention may provide one or more advantages. For example, the MAC architecture described herein may offer a balance between software- and hardware-based MAC functions that achieves acceptable performance while offloading selected functionality to software. Performing selected MAC layer functions in software may result in memory, processing and power consumption savings in the MAC hardware, especially when the software-based MAC component runs on a host processor. In this manner, the MAC architecture may take advantage of processing power and memory already plentiful in the host device, reducing size, cost and complexity of the network access station that contains the MAC hardware.

In addition, the MAC architecture may provide a number of features that support an efficient and robust interface between the software- and hardware-based MAC components. As mentioned above, the generation of a command structure by the software-based MAC component may be useful in efficiently and reliably passing instructions for processing packets within the hardware-based MAC component. In addition, the provision of multiple transmit queues may permit ready differentiation of packets, e.g., for service of time-critical packets or QoS prioritization. Also, the MAC architecture may achieve further memory savings by dynamically managing keys in the software-based MAC component according to current station associations. Further, the MAC architecture may promote ready link assessment as described herein without additional use of the air interface by taking advantage of the retransmission requirements already built into some WLAN MAC layer requirements.

Additional details of various embodiments are set forth in the accompanying drawings and the description below. Other features, objects and advantages will become apparent from the description and drawings, and from the claims.

DETAILED DESCRIPTION

Figure 1:
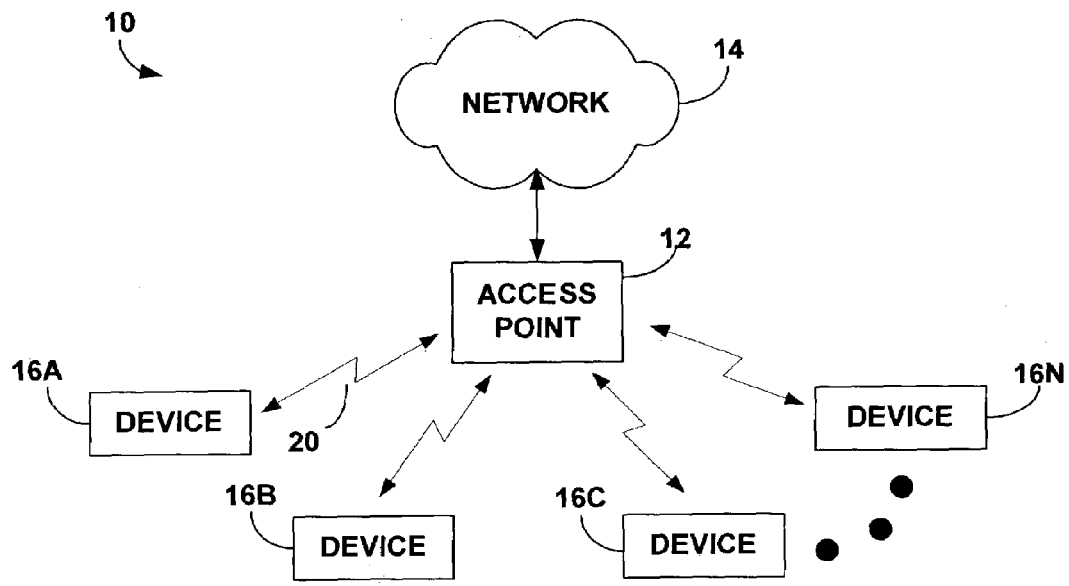
FIG. 1 is a block diagram illustrating a wireless communication network.

FIG. 1 is a block diagram illustrating a wireless communication network 10. As shown in FIG. 1, wireless communication network 10 may include a wireless access point 12 coupled to a wired network 14. Wireless access point 12 permits wireless communication between wired network 14 and one or more wireless communication devices 16A-16N (hereinafter 16). Wireless access point 12 and wireless communication devices 16 form WLAN "stations," and may communicate according to one or more WLAN protocols such as those specified by the IEEE 802.11a, 802.11b or 802.11g standards. Wireless communication network 10 will be generally described herein in the context of the IEEE 802.11 standards for purposes of illustration.

Wireless access point 12 may integrate a hub, switch or router to serve multiple wireless communication devices 16. Wireless communication network 10 may be used to communicate data, voice, video and the like between devices 16 and wired network 14 according to a variety of different wireless transmission formats. Network 14 may be a local area network, wide area network or global network such as the Internet.

Devices 16 may take a variety of forms including desktop computers, portable computers, personal digital assistants (PDAs), mobile telephones, multimedia devices, consumer electronics, and the like. Each device 16 is equipped with WLAN station hardware to provide attachment to wireless communication network 10. For example, a device 16 may include WLAN station card or board coupled to a host computer via an external or internal interface, including PCI, Mini PCI, USB, USB-2, Cardbus, IEEE 1394, SCSI, or PCMCIA interfaces. In general, one or more of devices 16 implement a MAC architecture that divides selected MAC layer functionality between a hardware-based MAC component and a software-based MAC component, as will be described.

Figure 2:
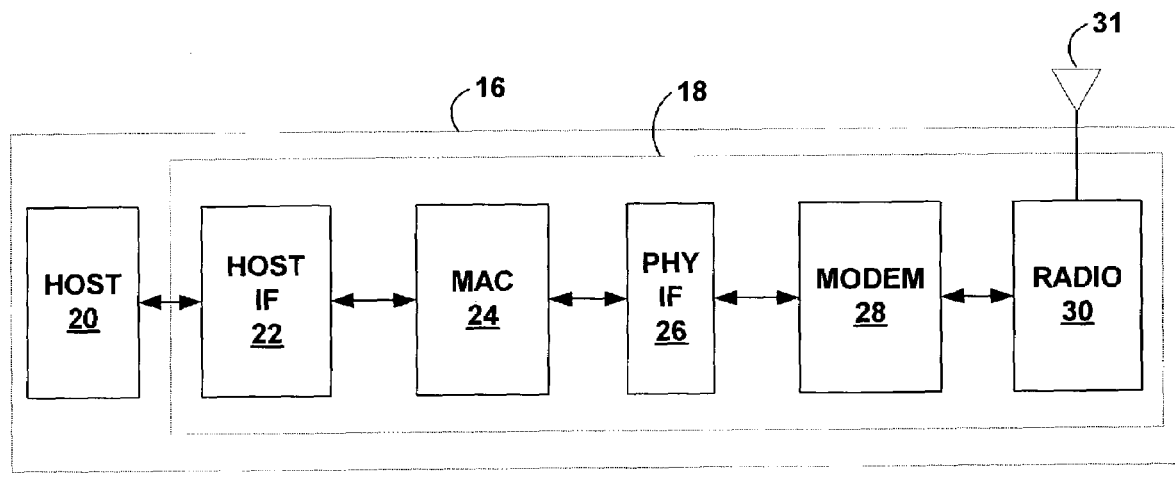
FIG. 2 is a block diagram illustrating a wireless communication device.

FIG. 2 is a block diagram illustrating a wireless communication device 16 in greater detail. As shown in FIG. 2, device 16 includes a host 20 coupled to a WLAN station 18. Again, WLAN station 18 may take the form of a network card or board mounted in or coupled to host 20. WLAN station 18 includes a host interface (IF) 22 that couples host 20 to MAC 24. MAC 24 is coupled, via physical (PHY) interface 26, to a modem 28. Device 16 also includes a radio 30 and RF antenna 31. RF antenna 31 transmits and receives RF signals. Modem 28 handles baseband processing of packets transmitted and received via radio 30 and antenna 31. Radio 30 may include circuitry for upconverting signals to RF for transmission, and downconverting received RF signals to baseband for processing by modem 28. Modem 28 encodes and decodes information carried by packets transmitted and received via radio 30 and antenna 31.

MAC 24 interacts with host 20 to facilitate communication between modem 28 and applications running on the host. Hence, host 20 may be a CPU within a computer, PDA, mobile telephone or some other device. MAC 24, modem 28, and radio 30 may be on a common integrated circuit chip, distributed across multiple chips or realized by discrete components. In accordance with the invention, MAC 24 may be formed by a software-based MAC component and a hardware-based MAC component. The hardware-based MAC component may be implemented on-chip or on-board. The software-based MAC component may run on a processor associated with host 20 and interact with the hardware-based MAC component via an external bus. Alternatively, the software-based MAC component may run on an embedded processor that resides on-chip or on-board with the hardware-based MAC component.

Figure 3:
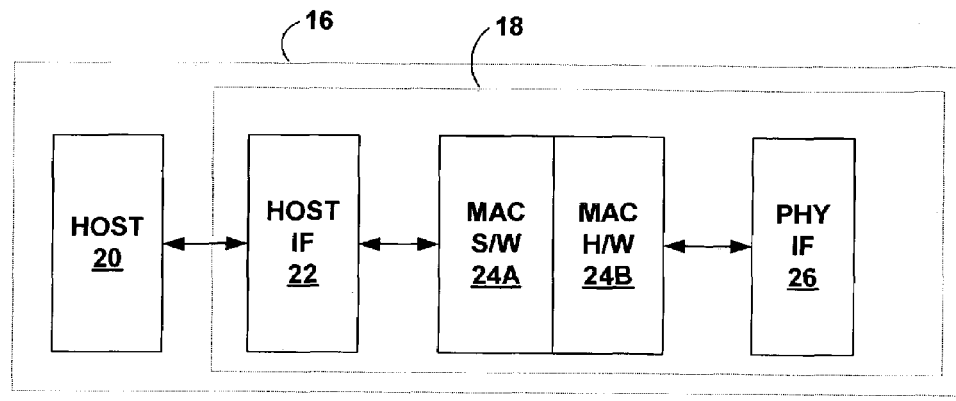
FIG. 3 is a block diagram illustrating MAC layer and interface circuitry associated with the device of FIG. 2.

FIG. 3 is a block diagram illustrating MAC layer and interface circuitry associated with device 16 of FIG. 2. In particular, FIG. 3 depicts the partitioning of MAC layer functionality between a software-based (S/W) MAC component 24A and a hardware-based (H/W) MAC component 24B. In the example of FIG. 3, MAC components 24A, 24B reside within WLAN station 18. In this case, software-based MAC component 24A may run on an embedded processor. In other embodiments, however, software-based MAC component 24A may run on a processor in host 20, and make use of system memory provided by the host. In either case, software-based MAC component 24A and hardware-based MAC component 24B work together to balance function and performance.

For example, hardware-based MAC component 24B is designed to handle many of the functions that are processor-intensive and must be performed quickly. On the other hand, software-based MAC component 24A is designed to handle many of the functions that are more memory-intensive, but present more lenient timing requirements. Thus, when software-based MAC component 24A is implemented to run on a host processor, the MAC layer can take advantage of processing power and memory resources already provided by host 20.

As will be described, hardware-based MAC component 24B may be responsible for functionality requiring heightened responsiveness such as clear channel assessment, collision retransmission, error detection, which is intimately linked to collision retransmission, and encryption and decryption. Such functions are generally processor-intensive, and subject to more aggressive timing requirements. In contrast, software-based MAC component 24A may perform functions that permit more processing time, present aggressive memory requirements, or both. Examples of functions that may be performed by the software-based MAC component 24A include fragmentation, authentication, and network management.

Figure 4:
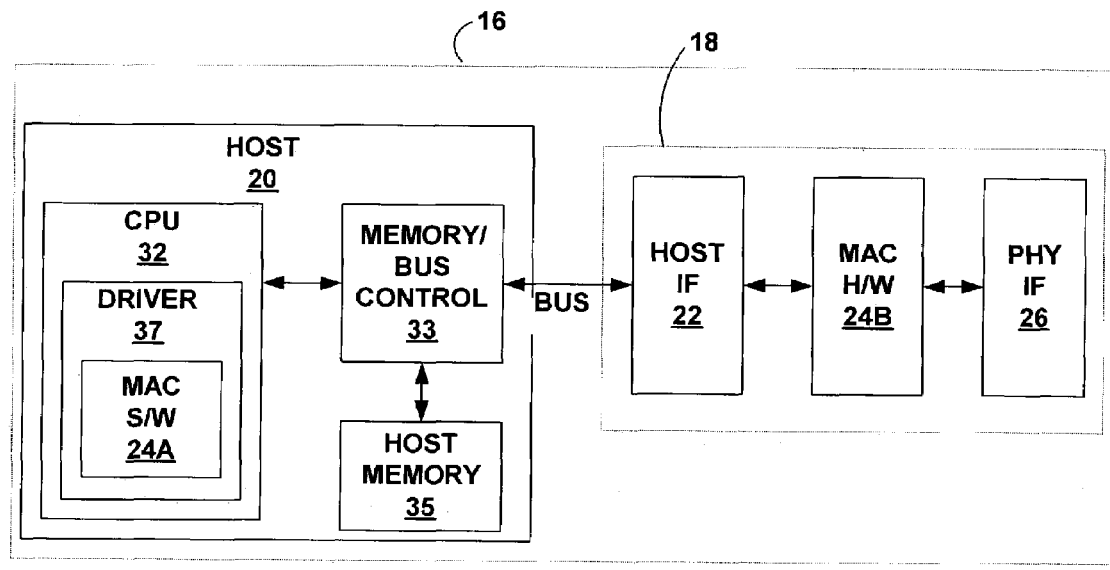
FIG. 4 is a block diagram illustrating implementation of software-based MAC layer functionality in a host processor.

FIG. 4 is a block diagram illustrating implementation of software-based MAC layer functionality in a host processor. As shown in FIG. 4, host 20 may include a central processing unit (CPU) 32, memory/bus controller 33 and host memory 35. CPU 32 runs communication applications that access WLAN station 18 to receive and transmit information via network 10. In addition, CPU 32 runs a driver 37 that drives WLAN station 18 via host interface 22 and memory/bus controller 33. Software-based MAC component 24A is implemented within driver 37, and provides a variety of MAC layer functionality using processing and memory resources resident in host 20. In this case, the implementation of a software-based MAC component 24A may reduce the processing and memory requirements on the board or chip carrying hardware-based MAC component 24B and other components of WLAN station 18.

Figure 5:
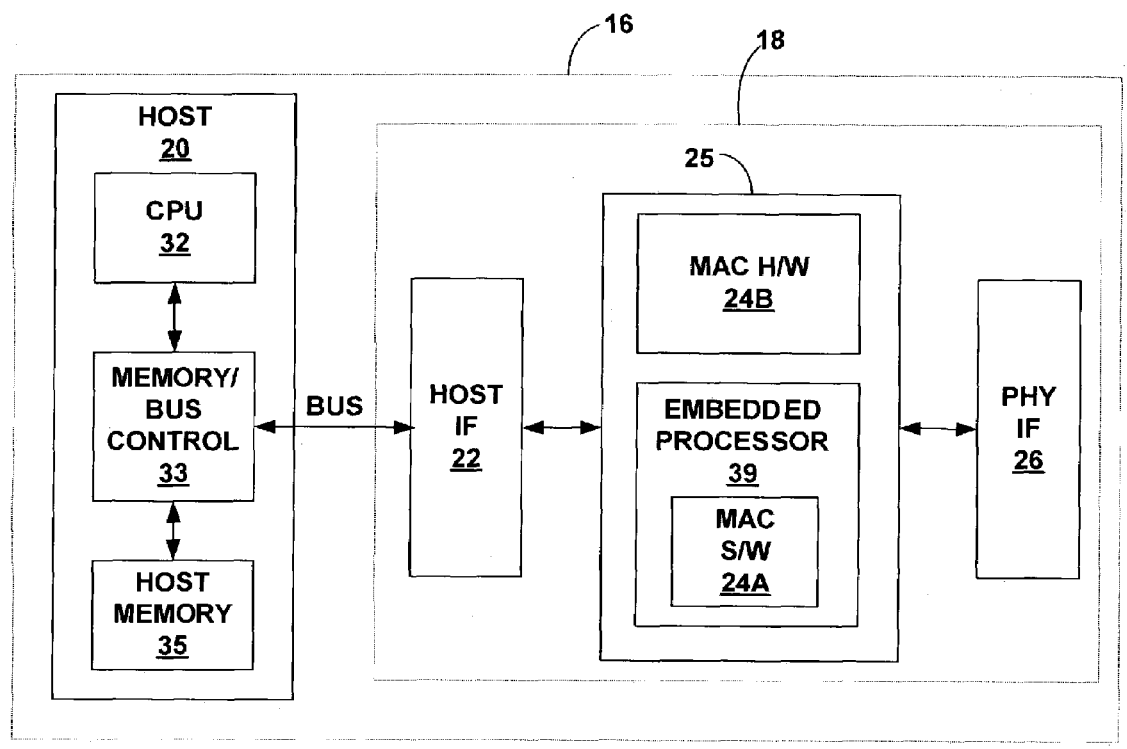
FIG. 5 is a block diagram illustrating implementation of software-based MAC layer functionality in an embedded processor.

FIG. 5 is a block diagram illustrating implementation of software-based MAC layer functionality in an embedded processor. As shown in FIG. 4, hardware-based MAC component 24B may be integrated with an embedded processor 39, e.g., on a common board or chip 25, and may include appropriate memory resources to run software-based MAC component 24A on the embedded processor. Software-based MAC component 24A performs a variety of MAC layer functions in software running in embedded processor 39, which may reside on-board or on-chip with hardware-based MAC component 24B. In this example, software-based MAC component 24A does not exploit processing and memory resources on host 20, but offers flexibility in adjusting the functionality and performance of various MAC layer functions.

An application running on host 20 may send configuration commands across host interface 22, for example, to configure various functional or performance aspects of software-based MAC component 24A. In turn, software-based MAC component 24A may configure or drive hardware-based MAC component 24B to achieve desired functionality or performance. As will be described, software-based MAC component 24A may generate a command structure that includes fields containing instructions for processing of packets by hardware-based MAC component 24B. Software-based MAC component 24A passes the command structure to hardware-based MAC component 24B with packets to be processed, and thereby provide different processing instructions for individual packets. Accordingly, partitioning of functionality between software-based MAC component 24A and hardware-based MAC component 24B may offer enhanced flexibility.

Figure 6:
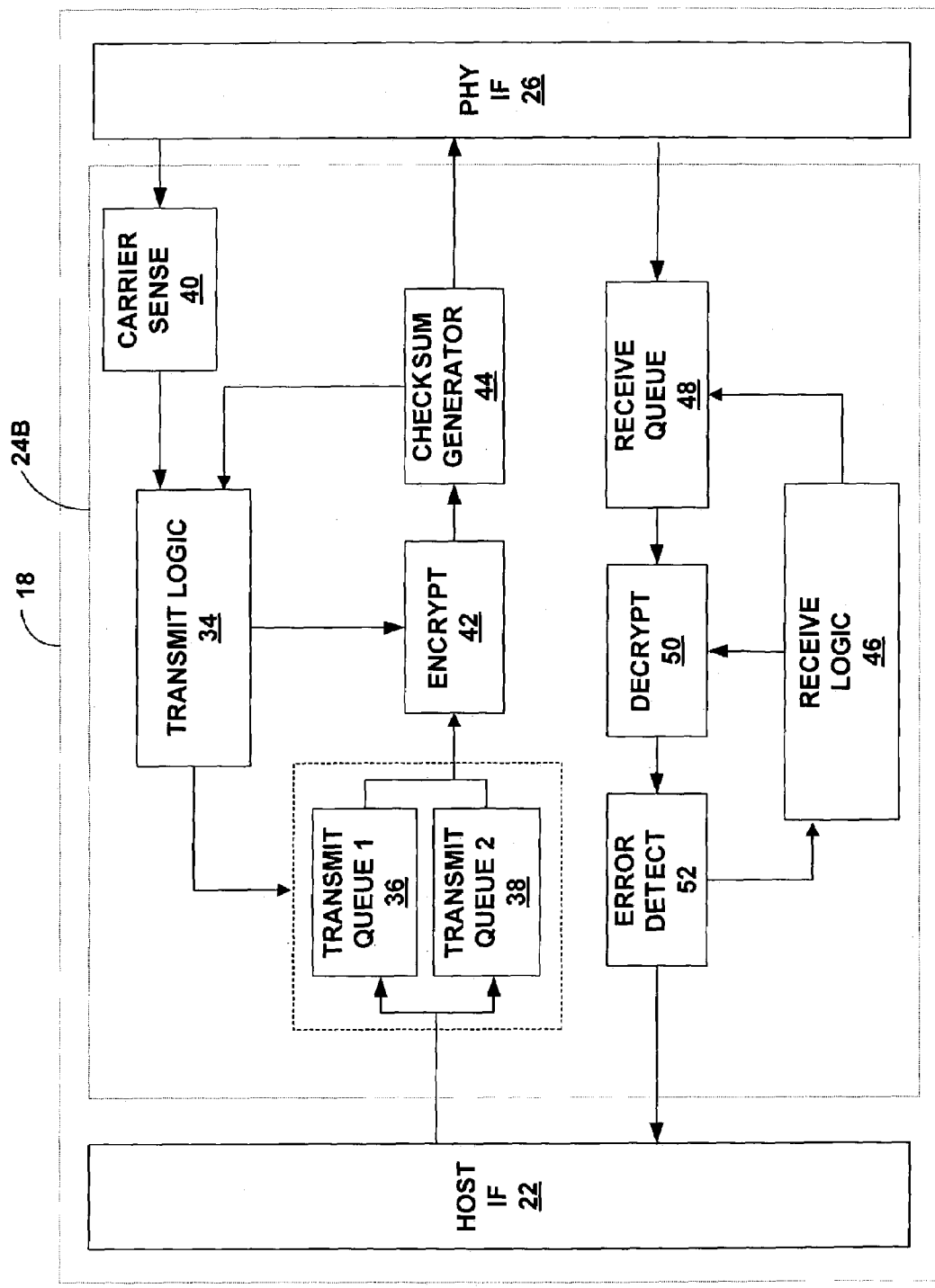
FIG. 6 is a block diagram illustrating a hardware-based MAC layer.

FIG. 6 is a block diagram illustrating a hardware-based MAC layer. As shown in FIG. 6, WLAN station 18 include host interface 22, physical interface 26, and various hardware components that form a hardware-based MAC component 24B and implement MAC layer functionality. Hardware-based MAC component 24B interacts with a software-based MAC component implemented on a host 20 (not shown in FIG. 6). Host 20 sends packets across host interface 22. Transmit logic 34 coordinates input and output of packets to and from transmit queues 36, 38. Incorporation of two or more physically separate transmit queues within hardware-based MAC component 24B may permit differentiation of packets for transmission and delivery of QoS features.

Host 20 may write packets directly into one or both of transmit queues 36,38 via the software-based MAC component 24A running within the driver software 37 executed by host CPU 32. In this manner, there is no need for additional memory for intermediate storage of packets within WLAN station 18. Instead, the only copies of the packets are stored in a respective transmit queue 36, 38. If there is a transmission failure, there is no buffered copy of the processed packet that experienced transmission failure. In other words, the hardware-based MAC component 24B does not store a copy of the processed packet, i.e., a packet subjected to encryption and other transmission processing. Instead, hardware-based MAC component 24B again pulls the unprocessed, raw packet that experienced transmission failure from the pertinent transmit queue 36, 38. Hardware-based MAC component 24B reprocesses the packet and attempts retransmission of the packet until transmission is successful or the maximum number of retransmission attempts specified by software-based MAC component 24A has been reached. Thus, a raw or unprocessed packet generally refers to a packet that has not been subjected to encryption, checksum generation or other transmission processing. In some modes of operation, software-based MAC component 24A may specify zero retransmission attempts by hardware-based MAC component 24B. In this case, instead of hardware-based MAC component 24B pulling a packet from one of transmit queues 36, 38, software-based MAC component 24A simply retransmits the raw, unprocessed packet across host interface 22 for reprocessing by hardware-based MAC component 24B. As will be described, the use of a command structure incorporating sequence numbers may be helpful in identifying pertinent packets for retransmission.

Transmit logic 34 controls removal of packets from transmit queues 36, 38. If specified by the applicable command structure, as will be described, encryption module 42 encrypts the packets removed from transmit queues 36, 38. In addition, a checksum generation module 44 generates a checksum for outgoing packets. Transmit logic 34 may be responsive to a carrier sense module 40. Transmit logic 34 implements distributed coordination function (DCF), a form of carrier sense multiple access with collision avoidance (CSMA/CA), via physical interface 26. In some embodiments, transmit logic 34 may implement point coordination function (PCF) or other channel access mechanisms. When carrier sense module 40 indicates that the air interface is available, transmit logic 34 controls queues 36, 38 to remove a packet for processing by encryption module 42 and checksum generation module 44. The packet is then transmitted across the physical interface 22 for further processing by modem 28 and eventual transmission by radio 30. When transmit logic 34 detects a transmission failure due to absence of an acknowledgement from a target station, hardware-based MAC component 24B attempts retransmission. In particular, transmit logic 34 of hardware-based MAC component 34B attempts multiple transmissions until transmission is successful or a maximum number of transmission attempts is reached. Software-based MAC component 24A may specify the number of transmission attempts to be made by hardware-based MAC component 24B. In some cases, software-based MAC component 24A may specify zero retries by hardware-based MAC component 24B. In this case, software-based component 24A may drive retransmissions directly. In particular, in the event of transmission failure, hardware-based MAC component 24B informs software-based MAC component 24A, which prepares another packet for retransmission. Transmit logic 34, carrier sense module 40, queues 36, 38, encryption module 42 and checksum generation module 44 may be formed by logic circuitry integrated in an application-specific integrated circuit (ASIC), field-programmable gate array (FPGA), or the like.

Hardware-based MAC component 24B may be configured to pull packets from queues 36, 38 on a selective basis. For example, software-based MAC component 24A may load configuration registers associated with hardware-based MAC component 24B to assign priorities to queues 36, 38. In this manner, hardware-based MAC component 24B, and particularly transmit logic 34, may be configured to expedite transmission of time critical packets such as beacons, which may be written to one of queues 36, 38 designated as high priority. In particular, transmit logic 34 may be configured to pull packets exclusively from one queue 36, 38 or the other, or to pull packets from both queues with a higher priority given to one of the queues. In addition, multiple queues 36, 38 can be used to separate packets that should be transmitted in an announcement traffic indication message (ATIM) period from those that should not. Also, hardware-based MAC component 24B may be capable of processing the packets according to quality of service (QoS) designations for the packets.

Software-based MAC component 24A formats and prioritizes packets that are to be sent out over the air interface before the packets are transmitted to hardware-based MAC component 24B. In addition, software-based MAC component 24A may be configured to selectively write packets into one of queues 36, 38 based on priorities or time dependencies associated with the packets. Software-based MAC component 24A also may have a number of virtual queues to assist QoS functions prior to transmission of packets to the hardware-based MAC component. If software-based MAC component 24A runs on host processor 28, hardware-based MAC component 24A may require less processing and memory resources. If software-based MAC component 24A runs on an embedded processor 39, the MAC layer may benefit from added flexibility.

Again, hardware-based MAC component 24B may be configured to store outgoing packets only in transmit queues 36, 38. In the event packet retransmission is required, hardware-based MAC component 24B retrieves a copy of the raw packet from transmit queues 36, 38. Alternatively, if zero retransmission attempts are specified for hardware-based MAC component 24B, software-based MAC component 24A simply rewrites the packet to the transmit queues 36, 38 for reprocessing. By not storing the processed packet in hardware-based MAC component 24B, however, the overhead required to track packets through the hardware is decreased. Thus, as a packet is being sent to physical interface 26, it is being processed for transmission. If retransmission is required, this processing takes place all over again on the raw packet retrieved from the pertinent transmit queue 36, 38. Again, by not storing the processed packet the overhead required to track packets through the hardware is decreased. Also, interruptions in the transmit pipe, e.g., for QoS or time-dependent packets, can be achieved simply and cleanly.

As further shown in FIG. 6, receive logic 46 controls a receive queue 48 to receive packets from modem 28 and radio 30 across physical interface 26. Receive logic 46 pulls packets from receive queue 48 for processing by a decryption module 50 and error detection module 52. Upon decryption and error detection processing, hardware-based MAC component 24B transfers packets for processing by host 20 via host interface 22. Receive logic 46, receive queue 48, decryption module 50, and error detection module 52 may be formed by logic circuitry integrated in an ASIC, FPGA, or the like.

Figure 7:
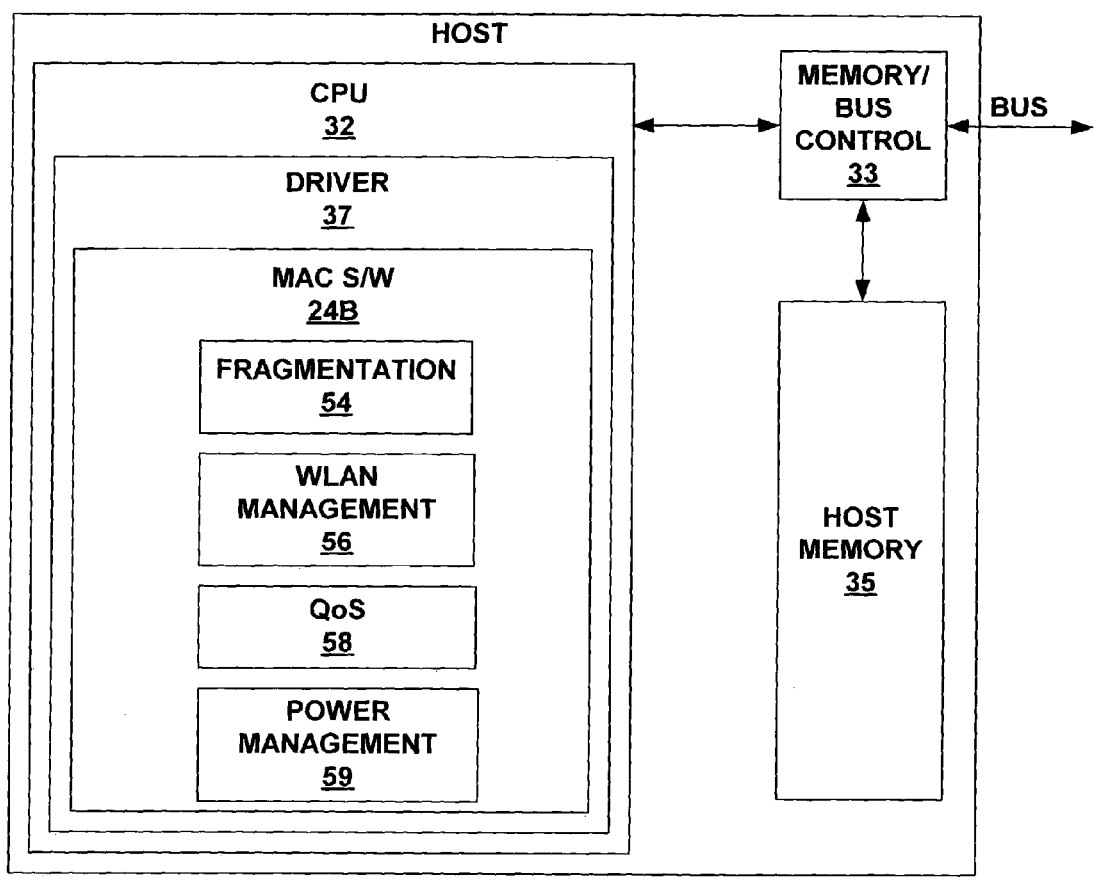
FIG. 7 is a block diagram illustrating implementation of the software-based MAC layer of FIG. 4 in greater detail.

FIG. 7 is a block diagram illustrating implementation of the software-based MAC layer of FIG. 4 in greater detail. In particular, FIG. 7 depicts an embodiment in which software-based MAC component 24A runs within driver 37 on host CPU 32. Software-based MAC component 24A may perform a variety of different MAC layer functions, and particularly functions that may not be as time-sensitive as other MAC layer functions performed in hardware-based MAC component 24B. For example, as shown in FIG. 7, software-based MAC component 24A may include a fragmentation module 54, WLAN management module 56, QoS module 58, and power management module 59.

Fragmentation module 54 handles optional fragmentation of packets to be sent to hardware-based MAC component 24B. Fragmentation may be desirable in light of relatively higher bit error rates that may arise in WLAN environments. Fragmenting packets into sub-packets may reduce the impact of higher bit error rates to large blocks of data, and reduce retransmission time. Fragmentation is memory-intensive and requires substantial processing. The substantial processing and memory overhead that may be involved in the fragmentation process, including fragmentation of large packets, and formatting of the resulting sub-packets, may be borne by software-based MAC component 24A rather than hardware-based MAC component 24B. In turn, host CPU 32 bears the processing and memory overhead involved in fragmentation when software-based MAC component 24A runs on the host CPU.

WLAN management module 56 may handle a variety of functions including, for example, authentication of associated WLAN stations 18 within wireless communication network 10, network access, scanning, and association of WLAN stations. In particular, WLAN management module 56 manages the authentication of the identities of WLAN stations 16 either by open system authentication or shared key authentication. In open system authentication, a WLAN station 18 first initiates the process by sending an authentication request packet to an access point 12. Access point 12 replies with an authentication response packet that approves or disapproves the authentication.

Shared key authentication involves the exchange of wired equivalent privacy (WEP) keys. In general, access point 12 transmits information to a WLAN station 16, which then encrypts the information using its WEP key and transmits the encrypted information back to the access point. Access point 12 then decrypts the information and compares it to the original information to verify authentication. The authentication process, and especially the management of WEP keys, can be both processing- and memory-intensive. Accordingly, like fragmentation, implementation of the authentication process within software-based MAC component 24B may be desirable in order to take advantage of the processing and memory resources provided by host 20.

Software-based MAC component 24A also may perform a variety of QoS functions via QoS module 58. As mentioned above, for example, software-based MAC component 24A may maintain a set of virtual queues that aid in prioritization of packets, and selectively write the packets across host interface 22 into one of transmit queues 36, 38. In addition, as will be described, software-based MAC component 24A may generate a command structure with each packet that specifies processing instructions for hardware-based MAC component 24B. Hardware-based MAC component 24B parses the command structure to extract and interpret processing instructions. Based on the instructions in the command structure, transmit logic 34 controls transmission of packets from queues 36, 38, possibly implementing a prioritization scheme, as well as encryption and error detection by encryption module 42 and checksum generation module 44. In addition, QoS module 58 may be configured to perform link quality assessment and QoS adjustment, as will be described.

Power management module 59 may be responsible for setting transmit power levels, and managing power saving modes within hardware-based MAC component 24B. For example, power management module 59 may perform link assessment functions as described herein to evaluate link quality and thereby select appropriate transmit power levels for transmission of packets. As will be described, power management module 59 may specify both an initial transmit power level and incremental increases in transmit power levels upon retransmissions. Also, power management module 59 may control hardware-based MAC component 24B to implement proprietary or standards specified power saving modes.

Figure 8:
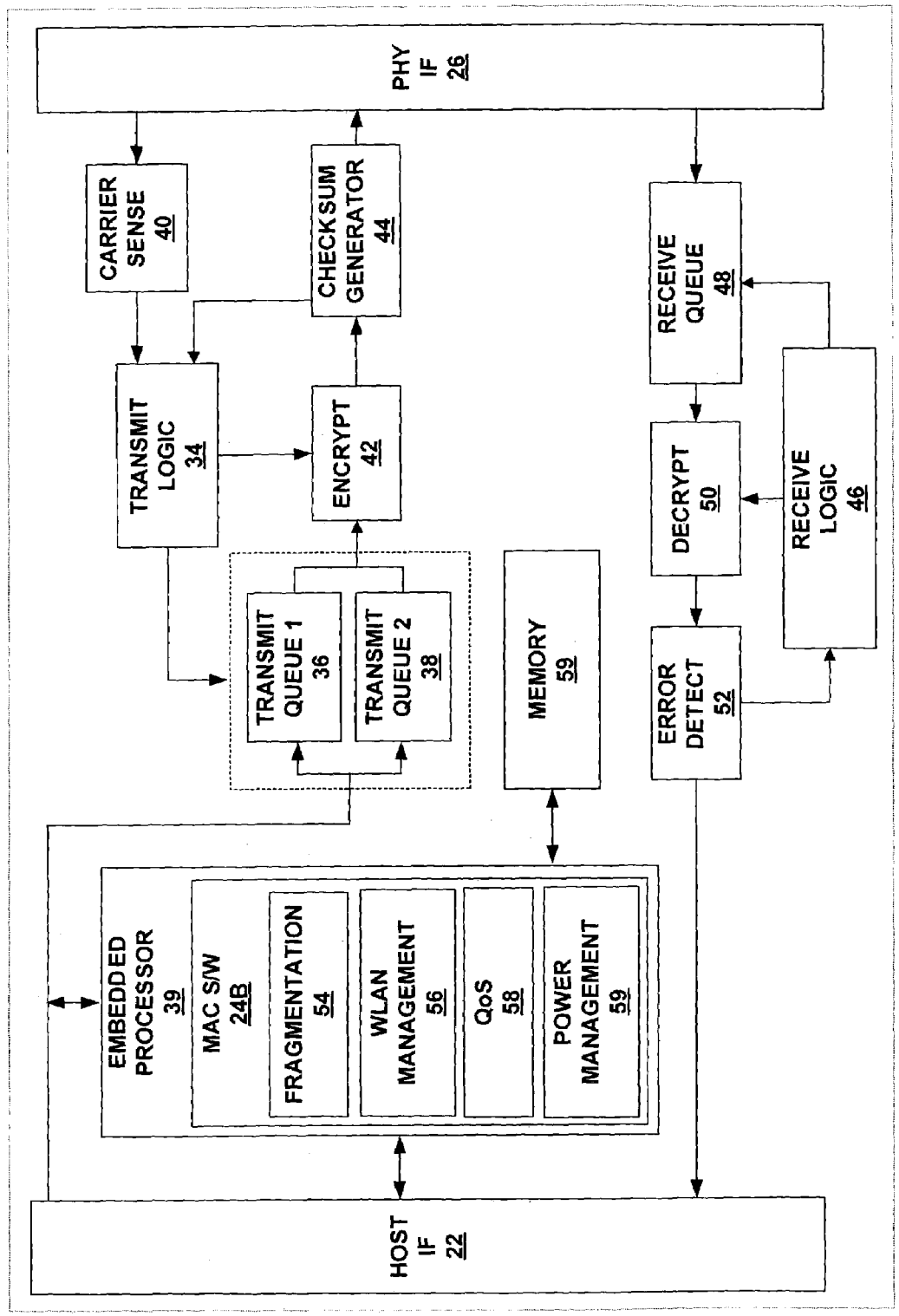
FIG. 8 is a block diagram illustrating implementation of the software-based MAC layer of FIG. 5 in greater detail.

FIG. 8 is a block diagram illustrating implementation of the software-based MAC layer of FIG. 5 in greater detail. In the example of FIG. 8, software-based MAC component 24A runs on an embedded processor 39 within a chip or board that includes hardware-based MAC component 24B. Embedded processor 38 may use memory 59 provided on-board or on-chip. As described with reference to FIG. 7, software-based MAC component 24A may include multiple functional modules, such as fragmentation module 54, WLAN management module 56, QoS module 58, and power management module 59. Execution of software-based MAC component 24A in an embedded processor 39 may not present the processor and memory savings achieved by execution on host CPU 32. However, software-based MAC component 24A may present added flexibility and configurability in the MAC layer to provide more flexible and customized processing of packets.

Figure 9:
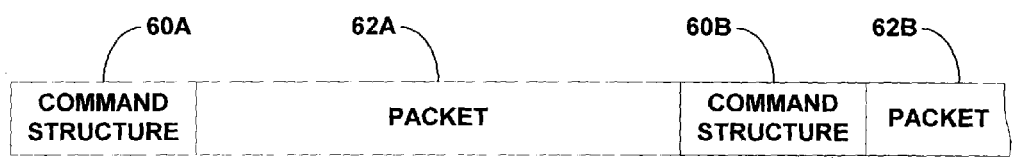
FIG. 9 is a diagram illustrating a series of WLAN packets preceded by command structures that specify processing requirements for the packets.

FIG. 9 is a diagram illustrating a series of WLAN packets 62A, 62B preceded by command structures 60A, 60B that specify processing requirements for the packets. Software-based MAC component 24A, whether implemented on host 20 or an embedded processor 39, generates the command structure according to processing requirements for each packet. The command structure may be transmitted to hardware-based MAC component 24B with or within a respective packet. Hence, this command structure 60 is sent to hardware-based MAC component 24B along with the packet to be transmitted, and it is stored in the same queue (FIFO) immediately ahead of the packet. Connecting the command structure 60 to the packet provides a tight coupling and simplifies the hardware by eliminating the need for separate command queues.

In the example of FIG. 9, each packet 62 is preceded by an associated command structure 60. Thus, packets 62 and command structures 60 may flow in the same data stream from software-based MAC component 24A to one of transmit queues 36, 38 of hardware-based MAC component 24B. However, only the packets are transmitted over physical interface 26. Even though command structure 60 occupies the same queue as packet 62, the command structure is discarded after use. In particular, command structure 60 is used as a guide for processing of packet 62.

Command structure 60 specifies processing requirements for the packet 62 that immediately follows the command structure. In this manner, software-based MAC component 24A may write the command structure just ahead of the corresponding packet in one of transmit queues 36, 38. Transmit logic 34 extracts the command structure 60 from the respective transmit queue 36, 38, parses the fields in the command structure, and interprets information contained in the fields to determine processing requirements for the packet 62 that follows the command structure.

According to this example, each packet 62 includes an associated command structure 60. In other embodiments, however, the command structure may pertain to a series or group of packets. In addition, rather than preceding a packet 62, the command structure 60 could be embedded within a header associated with the packet. In each case, command structure 60 may contain one or more fields that permit processing instructions to be readily transmitted across host interface 22 to hardware-based MAC component 24B in a reliable, robust manner. In particular, hardware-based MAC component 24B modifies its processing of individual packets based on the contents of command structure 62, in effect programming the hardware-based MAC component on a dynamic packet-by-packet basis.

This approach is in contrast to writing to command registers within hardware-based MAC component 24B. Rather, hardware-based MAC component 24B processes the command structures and packets on the fly, avoiding latency that would clog throughput and undermine the ability to make changes on a packet-by-packet basis. In some embodiments, however, software-based MAC component 24A also may be configured to write to configuration registers associated with hardware-based MAC component 24B to modify functionality on a more persistent basis. As a further alternative, software-based MAC component 24A may pass the command structure to control particular functions performed by hardware-based MAC component 24B, and write to configuration registers to control other functions performed by the hardware-based MAC component. In addition, in some embodiments, hardware-based MAC component 24B may parse the command structure and, in response, set configuration registers to specify particular functionality for a series of packets.

Figure 10:
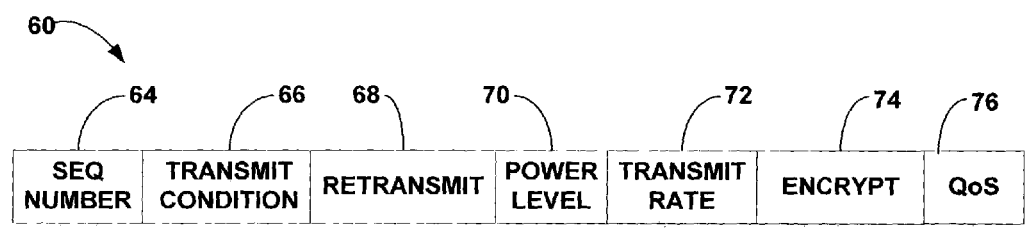
FIG. 10 is a diagram illustrating fields within an exemplary command structure as shown in FIG. 9.

FIG. 10 is a diagram illustrating fields within an exemplary command structure 62 as shown in FIG. 9. The invention may also be directed to data structure associated with command structure 62 and computer-readable media for storing or propagating such a data structure. The computer-readable media may take the form of a magnetic medium, optical medium, non-volatile random access memory (NVRAM), dynamic random access memory (DRAM), FLASH memory, or the like, as well as network media, whether electrical, optical, infrared, or radio frequency, for propagating such a data structure. As shown in FIG. 10, command structure may include a sequence (SEQ) number field 64, a transmit condition field 66, a retransmit attempts field 68, a power level field 70, a transmit rate field 72, an encryption field 74 and a QoS field 76.

Sequence number field 64 contains a sequence number for internal tracking and feedback. The sequence number is unrelated to the MAC header sequence number contained in packet 62. Instead, the sequence number in field 64 aids in tracking in the event of transmission failure. For example, if there has been a transmission failure, software-based MAC component 24A can read a hardware register within hardware-based MAC component 24B to find the sequence number of the packet that experienced the failure. This is advantageous as hardware-based MAC component 24B may have many packets queued up in transmit queues 36, 38 for transmission.

Using the sequence number, software-based MAC component 24A determines which packet or packets experienced failure, and reprocesses the packet for transmission to hardware-based MAC component 24B for a retry. Again, in this embodiment, no copies of processed packets 62 are stored in hardware-based MAC component 24B. Instead, the only packet copy is written to transmit queues 36, 38. Accordingly, once transmit failure occurs, software-based MAC component 24A simply retransmits the raw, unprocessed packet, with the aid of the pertinent sequence number. Alternatively, the retransmissions can be attempted by hardware-based component 24B by pulling the raw packet from one of transmit queues 36, 38. In some embodiments, the sequence number also may signify dependencies between different packets 62.

Transmit condition field 66 details the stimuli that can initiate transmission of a packet by hardware-based MAC component 24B, as well as the stimuli that can result in labeling the transmission as a success. Retransmit attempts field 68 specifies how many times transmit logic 34 in hardware-based MAC component 24B should attempt retransmission of a packet before generating a transmission failure. Power level field 70 specifies the transmit power levels to use for a particular packet. In some cases, different transmit power levels may be used for different packets in light of assessed link quality to implement QoS.

Transmit rate field 72 specifies the rate of transmission of a particular packet, e.g., a data rate in Mbits/second. In particular, transmit rate field 72 may specify a rate appropriate for an assessed link quality, and could be used to implement QoS in some embodiments. Encryption field 74 indicates whether hardware-based MAC component 24B should apply encryption processing to the pertinent packet, or send the packet in a non-encrypted state.

QoS field 76 allows a quality of service adjustment. In particular, QoS field 76 instructs hardware-based MAC component 24B to increase transmit power on retries if a specified number of transmit failures have occurred. QoS field 76 can be used as a metric to quantify the quality of an RF link. When a link quality assessment is desired, software-based MAC component 24A attempts a transmission at a power level that is estimated to be too low for success. For this transmission, software-based MAC component 24A instructs hardware-based MAC component 24B, via command structure 60, to increase the power level incrementally upon retransmissions.

In the link quality assessment mode, after the packet is successfully transmitted, software-based MAC component 24A determines the number of retransmissions needed before success, e.g., by reading a register in hardware-based MAC component 24B. From this determination, software-based MAC component 24A derives the minimum power level needed for acceptable link quality at a specific data rate. Following the link quality assessment, software-based MAC component 24A may adjust the contents of power level field 70, transmit rate field 72, or both within subsequently transmitted command structures 60 to ensure adequate link quality.

In some embodiments, rather than start with a power level that is estimated to be too low for successful transmission and then ramp transmit power upward, the link quality assessment mode may be configured to start at a power level that is estimated to be assured of success and then ramp downward in subsequent transmissions until transmissions are unsuccessful. The last setting of the power level that allowed successful transmission is thus the minimum power level required to sustain the link with the target.

Figure 11:
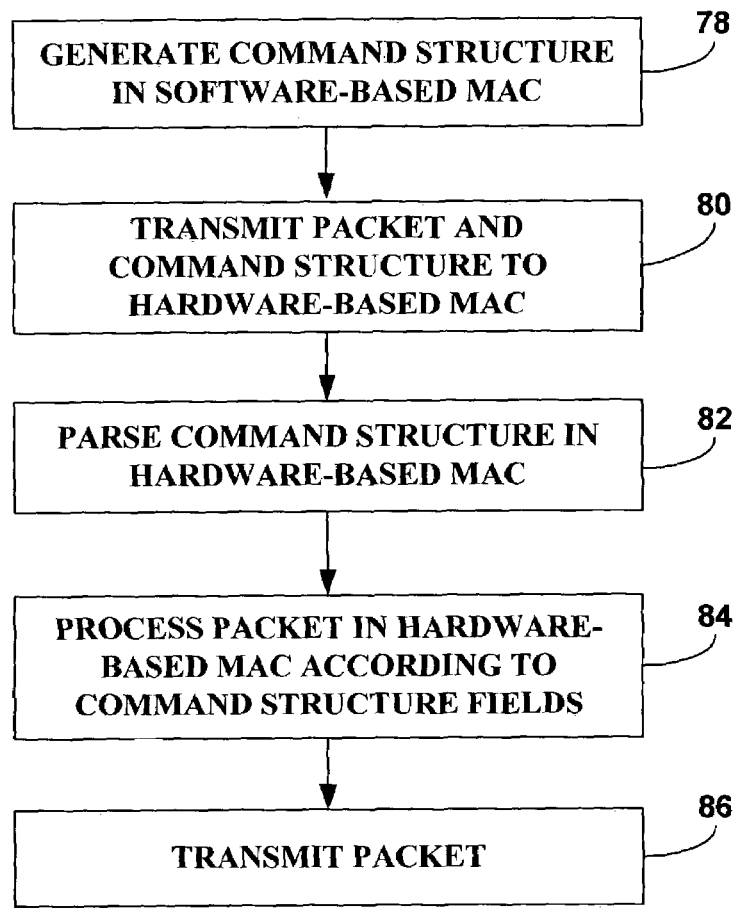
FIG. 11 is a flow diagram illustrating a process for processing packets within a hardware-based MAC component according to a command structure generated by a software-based MAC component.

FIG. 11 is a flow diagram illustrating a process for processing packets within a hardware-based MAC component 24B according to a command structure generated by a software-based MAC component 24A. As shown in FIG. 11, software-based MAC component 24A generates a command structure for each packet (78), and transmits the command structure and the packet to hardware-based MAC component 24B (80), e.g., to one of transmit queues 36, 38. Hardware-based MAC component 24B pulls the command structure from the respective transmit queue 36, 38, and parses the command structure (82). Based on the content of the various fields in the command structure, hardware-based MAC component 24B processes the packet (84), and then transmits the packet (86) via physical interface 26 for handling by modem 28 and radio 30.

Figure 12:
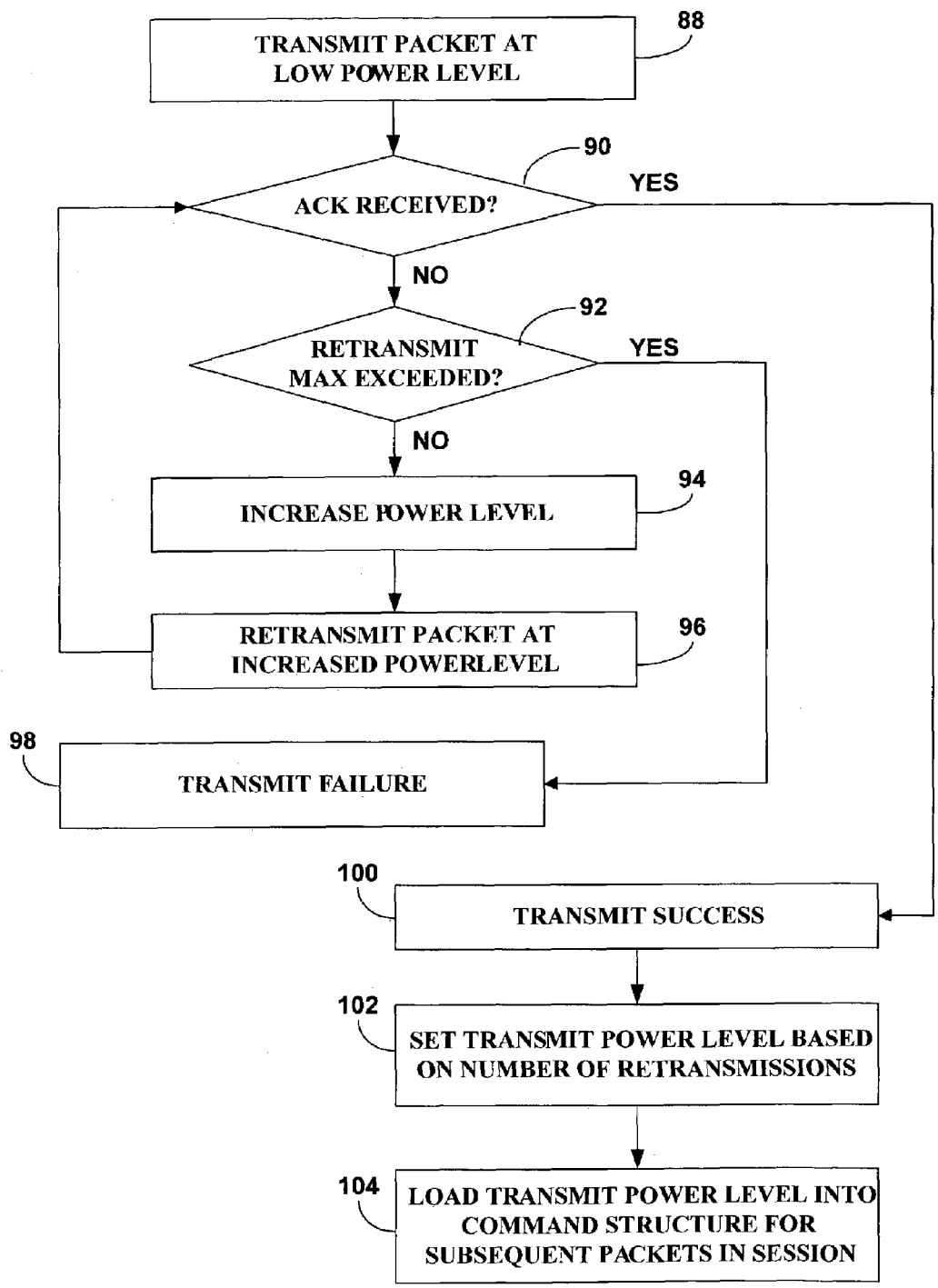
FIG. 12 is a flow diagram illustrating a process for link assessment and transmit power control in MAC layer as described herein.

FIG. 12 is a flow diagram illustrating a process for link assessment and transmit power control in the MAC layer in greater detail. As shown in FIG. 12, the process may involve transmitting a packet at a low transmit power level (88). The low transmit power level is selected with the intention of producing insufficient transmit power to achieve successful transmission. The low transmit power may be specified in the transmit power field of the command structure. The link assessment process may be initiated based on the contents of the QoS field in the command structure.

If an acknowledgement (ACK) from the target access point or WLAN station is not received (90), a transmission failure is detected. If the number of retransmissions, i.e., "retries," has not already been exceeded (92), hardware-based MAC component 24B reprocesses and retransmits the packet at an increased transmit power level in the transmit power field (94). The command structure transmitted by software-based MAC component 24A may specify the amount by which the transmit power is to be increased on each retransmission during link quality assessment. Again, the number of retransmissions may be set in the retransmit attempts field of the command structure. The transmit power level may be increased in fixed amounts or different amounts based on the number of retransmission attempts executed. Hardware-based MAC component 24B then retransmits the packet at the increased transmit power level (96). In some embodiments, the command structure could specify zero retransmissions, in which case software-based MAC component 24A may handle retransmission of packets to transmit queues 36, 38 with command structures indicating transmit power increases for purposes of link assessment.

The process of incrementally increasing transmit power continues until the maximum number of retransmissions has been exceeded (92), in which case a transmit failure is determined (98), or until an acknowledgement is successfully received from the target access point or station (90), in which case transmit success is determined (100). When transmit success is achieved, software-based MAC component 24A reads a register in hardware-based MAC component 24B to determine the number of retransmissions required to achieve transmit success (102). Based on the number of retransmissions and the known increase in transmit power per retransmission, software-based MAC component 24A can determine the transmit power level necessary to achieve transmit success and, hence, acceptable link quality for a given transmit rate. Software-based MAC component 24B then may load the transmit power level into the command structures for subsequent packets directed to the target station (104). Software-based MAC component 24B also may select a particular transmit rate based on the link quality assessment, and specify that rate in the command structure.

As an alternative, the link quality assessment process may start with an initial packet transmitted at an intentionally high power level estimated to achieve successful transmission with reasonable certainty. In this case, software-based MAC component 24A may retransmit a packet several times at incrementally decreasing transmit power levels until transmission is no longer successful, i.e., the target station does not transmit an acknowledgement packet. Like the process illustrated in FIG. 12, a link quality assessment process that decreases transmit power over a series of retransmissions is capable of obtaining a binary indication of whether the link quality is acceptable at a given transmit power level.

A link assessment process as described herein can be particularly advantageous for networks implementing IEEE 802.11 standards. Determining the quality of an RF link is critical in choosing transmit power level and data rate. Ordinarily, the method for determining the quality of a link involves a target delivering signal strength information back to the transmitting station. There is no mechanism in the IEEE 802.11 MAC layer protocols for processing signal strength information from the transmitting stations. Some existing 802.11 systems attempt to estimate transmit link quality by examining the receive signal strength indication (RSSI) for packets received from the target station. This approach provides no information about the actual transmit path characteristics, and does not reveal the actual transmit power of the target station. Moreover, the transmit path may be quite different from the receive path. Therefore, in general, such an approach provides little useful information to the transmitting station.

In contrast, the link assessment process described herein provides an alternative approach that is capable of determining the actual transmit power necessary to achieve transmit success at a given transmit rate along the transmit path. In addition, link quality can be assessed in a binary manner. The link assessment process, in accordance with the invention, utilizes some of the aspects of the IEEE 802.11 protocols to receive binary feedback concerning the quality of the transmit link. Again, the software-based MAC component is able to adjust transmit power on a packet-to-packet basis. In addition, the IEEE 802.11 protocol requires the MAC layer to repeat a packet transmission for a number of times unless an acknowledgement is received from the target station.

Therefore, to determine the quality of a link, the software-based MAC component 24A may occasionally, e.g., in low traffic situations, send a directed packet, such as a benign management packet, or perhaps a data packet, to the target station at a power level that is judged to be too low for success. As described above, the software-based MAC component 24A then increases the transmit power on subsequent retransmissions until an acknowledgement is received. When the acknowledgement is received, software-based MAC component 24A can determine the minimum transmit power level at which the link is viable at the pertinent data rate. Although this approach is especially advantageous for 802.11 networks, it may be useful for other RF links.

In an 802.11 network, as a further advantage, retransmissions are automatically initiated in the MAC layer. As a result, the link quality assessment process requires little if any additional components or overhead in hardware-based MAC component 24B, may work entirely in the MAC layer, and requires no change to the existing 802.11 protocols. Moreover, the link quality assessment process may be effective with any target station, regardless of manufacturer, and should have an insignificant effect on data throughput. In particular, the transmitting station autonomously assesses link quality and sets transmit power without regard to the identity of the target station.

In 802.11, where retries are automatic in the MAC layer, this link quality assessment comes at almost no cost. The few retries needed to establish link quality are designed for in the protocol, and need only be performed very infrequently. In addition, the ability to incrementally increase transmit power until an acceptable link quality is achieved may permit fine-tuning of the transmit power to an optimum level. Hence, the process may permit power consumption savings, which can be especially advantageous when the pertinent WLAN station derives its operating power from battery-powered hosts.

A MAC architecture as described herein may be designed to support multiple protocols. For example, the MAC architecture may support 802.11a, 802.11b and 802.11g by interpreting the physical layer convergence procedure (PLCP) headers in packets differently, and by supplying different timing modules with hardware-based MAC component 24B. Software-based MAC component 24A may readily support the different versions of the protocol by treating the fields in the various management packets accordingly. Software-based MAC component 24A also may be configured to fill the duration fields in the packets appropriately for each version of the protocol. Software-based MAC component 24A may also update tables in hardware-based MAC component 24B that are used to find transmit times for various packets, such as acknowledgement (ACK) packets, clear to send (CTS) packets, and the like, as well as for short IFS (SIFS), DCF IFS (DIFS), PCF IFS (PIFS), and Extended IFS (EIFS) depending on the version of the protocol. Thus, a single MAC layer can be configured to control either or all of 802.11a, 802.11b, and 802.11g physical interfaces.

Hardware-based MAC component 24B may further include a hardware timing module that keeps the BSS time and the NAV. Receive logic 46 within hardware-based MAC component 24B may be configured to recognize legal beacons by parsing the type, subtype and BSSID fields in the MAC header. When a legal beacon is received, the BSS time is updated with the beacon timestamp. Receive logic 46 also may update the NAV with every legal duration field. In addition, unit-addressed messages can be address filtered in the receive logic 46, and multicast messages can be passed to software-based MAC component 24A for address filtering.

Software-based MAC component 24A may manage storage of large amounts of data, particularly when implemented on host 20, when data is stored for transmission to other units that are currently in a low power (power-saving, or PS) mode and cannot receive. This storage is done in the software, off of the chip, providing substantial memory savings.

If there is firmware on the chip with the hardware, this storage can be done in the driver software 37. Thus, in some embodiments, no special on-chip memory is ever needed. However, a hold-off mechanism may be provided between the software and firmware when there is firmware using a simple messaging technique that is dependent on the external bus. In PCI, the on-chip firmware can be the bus master. In this case, the technique may be simply a notification of a packet in the driver memory. The firmware will pull the packet in over the bus when it is required.

Various embodiments of the invention have been described. These and other embodiments are within the scope of the following claims.

The invention claimed is:

1. A method comprising:
   performing a first set of medium access control (MAC) layer functions for a packet with a software-based MAC component;
   sending the packet from the software-based MAC component to a hardware-based MAC component;
   sending a command structure with the packet from the software-based MAC component to the hardware-based MAC component, wherein the command structure contains instructions for processing the packet within the hardware-based MAC component; and
   performing a second set of MAC layer functions for the packet with the hardware-based MAC component in accordance with the instructions contained in the command structure, wherein the software-based MAC component and the hardware-based MAC component together implement MAC layer functionality for wireless networking.

2. The method of claim 1, further comprising sending the packet from the hardware-based MAC component via a physical interface for wireless transmission of the packet.

3. The method of claim 2, wherein the command structure includes a retransmission field that defines a maximum number of wireless transmission attempts for the packet in the event of transmission failure.

4. The method of claim 2, wherein the command structure includes a transmit power level field that defines a transmit power level for the wireless transmission of the packet.

5. The method of claim 2, wherein the command structure includes a transmit rate field that defines a rate of the wireless transmission of the packet.

6. The method of claim 2, wherein the command structure includes a sequence number field tat includes a unique sequence number associated with the packet.

7. The method of claim 2, wherein the command structure includes a transmit condition field defining one or more conditions for initiating the wireless transmission of the packet.

8. The method of claim 2, wherein the command structure includes a quality of service adjustment (QoS) field that defines a transmit power adjustment for a link quality assessment process.

9. The method of claim 1, further comprising sending the command structure and the packet from the software-based MAC component to a common transmit queue managed by the hardware-based MAC component.

10. The method of claim 9, wherein the transmit queue includes multiple transmit queues, the method further comprising sending the command structure and the packet from the software-based MAC component to a selected one of the transmit queues.

11. The method of claim 9, wherein the command structure precedes the packet in the transmit queue.

12. The method of claim 9, further comprising pulling the command structure from the transmit queue to obtain the instructions for processing the packet within the hardware-based MAC component.

13. The method of claim 1, further comprising sending the command structure from the software-based MAC component separately from the packet.

14. The method of claim 1, further comprising sending the command structure from the software-based MAC component within the packet.

15. The method of claim 1, further comprising performing packet fragmentation in the software-based MAC component.

16. The method of claim 1, further comprising performing authentication in the software-based MAC component, performing encryption in the hardware-based MAC component, and sending encryption keys for use in the encryption from the software-based MAC component to a table in the hardware-based MAC component.

17. The method of claim 1, wherein the software-based MAC component runs on a host processor and the hardware-based MAC component is implemented on a wireless local area network (WLAN) station that is coupled to the software-based MAC component via an external interface, the method further comprising sending the packet and the command structure to the hardware-based MAC component via the external interface.

18. The method of claim 17, wherein WLAN station comprises one of a network card and a board tat is coupled to the host processor via the external interface.

19. The method of claim 1, wherein the software-based MAC component runs on an embedded processor integrated with the hardware-based MAC component, the method further comprising sending the packet and the command structure to the hardware-based MAC component via an internal interface.

20. The method of claim 1, further comprising processing the packet in conformance with one of the IEEE 802.11 standards.

21. A device comprising:
a software-based medium access control (MAC) component that performs a first set of MAC layer functions for a packet; and
a hardware-based MAC component that performs a second set of MAC layer functions for the packet, wherein the software-based MAC component and the hardware-based MAC component together implement MAC layer functionality for wireless networking,
wherein the software-based MAC component is configured to send a packet and a command structure with the packet to the hardware-based MAC component, the command structure containing instructions for processing the packet within the hardware-based MAC component.

22. The device of claim 21, wherein the hardware-based MAC component sends the packet via a physical interface for wireless transmission of the packet.

23. The device of claim 22, wherein the command structure includes a retransmission field that defines a maximum number of wireless transmission attempts for the packet in the event of transmission failure.

24. The device of claim 22, wherein the command structure includes a transmit power level field that defines a transmit power level for the wireless transmission of the packet.

25. The device of claim 22, wherein the command structure includes a transmit rate field that defines a rate of the wireless transmission of the packet.

26. The device of claim 22, wherein the command structure includes a sequence number field that includes a unique sequence number associated with the packet.

27. The device of claim 22, wherein the command structure includes a transmit condition field defining one or more conditions for initiating the wireless transmission of the packet.

28. The device of claim 22, wherein the command structure includes a quality of service adjustment (QoS) field that defines a transmit power adjustment for a link quality assessment process.

29. The device of claim 21, further comprising a transmit queue managed by the hardware-based MAC component, wherein the software-based MAC component sends the command structure and the packet to that transmit queue.

30. The device of claim 29, wherein the transmit queue includes multiple transmit queues, and the software-based MAC component sends the command structure and the packet to a selected one of the transmit queues.

31. The device of claim 29, wherein the command structure precedes the packet in the transmit queue.

32. The device of claim 29, wherein the hardware-based MAC component pulls the command structure from the transmit queue to obtain the instructions for processing the packet.

33. The device of claim 21, wherein the software-based MAC component sends the command structure separately from the packet.

34. The device of claim 21, wherein the software-based MAC component sends the command structure within the packet.

35. The device of claim 21, wherein the software-based MAC component performs packet fragmentation in the software-based MAC component.

36. The device of claim 21, wherein the software-based MAC component performs authentication, the hardware-based Mac component performs encryption, and the software-based MAC component sends encryption keys for use in the encryption from to a table in the hardware-based MAC component.

37. The device of claim 21, wherein the software-based MAC component runs on a host processor and the hardware-based MAC component is implemented on a wireless local area network (WLAN) station that is coupled to the software-based MAC component via an external interface, and sends the packet and the command structure to the hardware-based MAC component via the external interface.

38. The device of claim 37, wherein WLAN station comprises one of a network card and a board that is coupled to the host processor via the external interface.

39. The device of claim 21, wherein the software-based MAC component runs on an embedded processor integrated with the hardware-based MAC component, and sends the packet and the command structure to the hardware-based MAC component via an internal interface.

40. The device of claim 21, wherein the software-based MAC component processes the packet in conformance with one of the IEEE 802.11 standards.

41. A tangible computer-readable storage medium comprising instructions that, when executed by at least one processor, causes the at least one processor to:
perform a first set of medium access control (MAC) layer functions for a packet with a software-based MAC component;
send the packet from the software-based MAC component to a hardware-based MAC component;
send a command structure with the packet from the software-based MAC component to the hardware-based MAC component, wherein the command structure contains instructions for processing the packet within the hardware-based MAC component; and
perform a second set of MAC layer functions for the packet with the hardware-based MAC component in accordance wit the instructions contained in the command structure, wherein the software-based MAC component and the hardware-based MAC component together implement MAC layer functionality for wireless networking.

42. The tangible computer-readable storage medium of claim 41, wherein the command structure includes a retransmission field that defines a maximum number of wireless transmission attempts for the packet in the event of transmission failure.

43. The tangible computer-readable storage medium of claim 41, wherein the command structure includes a transmit power level field that defines a transmit power level for wireless transmission of the packet.

44. The tangible computer-readable storage medium of claim 41, wherein the command structure includes a transmit rate field that defines a rate of wireless transmission of the packet.

45. The tangible computer-readable storage medium of claim 41, wherein the command structure includes a sequence number field that includes a unique sequence number associated with the packet.

46. The tangible computer-readable storage medium of claim 41, wherein the command structure includes a transmit condition field defining one or more conditions for initiating wireless transmission of the packet.

47. The tangible computer-readable storage medium of claim 41, wherein the command structure includes a quality of service adjustment (QoS) field that defines a transmit power adjustment for a link quality assessment process.

48. The tangible computer-readable storage medium of claim 41, wherein the instructions, when executed, cause the processor to send the command structure and the packet from the software-based MAC component to a common transmit queue managed by the hardware-based MAC component.

49. The tangible computer-readable storage medium of claim 48, wherein the transmit queue includes multiple transmit queues, and wherein the instructions, when executed, cause the processor to send the command structure and the packet from the software-based MAC component to a selected one of the transmit queues managed by the hardware-based MAC component.

50. The tangible computer-readable storage medium of claim 41, wherein the instructions, when executed, cause the processor to send the command structure from the software-based MAC component to the hardware-based MAC component separately from the packet.

51. The tangible computer-readable storage medium of claim 41, wherein the instructions, when executed, cause the processor to send the command structure from the software-based MAC component to the hardware-based MAC component within the packet.

52. The tangible computer-readable storage medium of claim 41, wherein the instructions, when executed, cause the processor to process the packet in conformance with one of the IEEE 802.11 standards.

* * * * *

UNITED STATES PATENT AND TRADEMARK OFFICE
CERTIFICATE OF CORRECTION

| | | |
|---|---|---|
| PATENT NO. | : 7,461,164 B2 | Page 1 of 1 |
| APPLICATION NO. | : 10/361807 | |
| DATED | : December 2, 2008 | |
| INVENTOR(S) | : Edwards et al. | |

It is certified that error appears in the above-identified patent and that said Letters Patent is hereby corrected as shown below:

In the claims:

On Column 18, line 2, "tat", (Claim 18), should read -- that --

Signed and Sealed this

Fifth Day of October, 2010

David J. Kappos
*Director of the United States Patent and Trademark Office*